United States Patent
Ip et al.

(10) Patent No.: US 10,846,331 B2
(45) Date of Patent: Nov. 24, 2020

(54) MUSIC RECOMMENDATIONS FROM TRENDING QUERIES

(71) Applicant: Google Inc., Mountain View, CA (US)

(72) Inventors: Lawrence Ip, San Carlos, CA (US); Sean Marney, San Francisco, CA (US); Shengwei Jiang, Mountain View, CA (US); Vivek Sharma, Redwood City, CA (US); Srivaths Ranganathan, Sunnyvale, CA (US); Yuh-jiun Wang, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 462 days.

(21) Appl. No.: 15/719,512

(22) Filed: Sep. 28, 2017

(65) Prior Publication Data
US 2018/0189391 A1    Jul. 5, 2018

Related U.S. Application Data

(60) Provisional application No. 62/440,312, filed on Dec. 29, 2016.

(51) Int. Cl.
| | |
|---|---|
| G06F 16/00 | (2019.01) |
| G06F 16/638 | (2019.01) |
| G06F 16/635 | (2019.01) |
| G06F 16/68 | (2019.01) |
| G06F 16/9535 | (2019.01) |
| G06F 16/2457 | (2019.01) |

(52) U.S. Cl.
CPC ...... *G06F 16/639* (2019.01); *G06F 16/24578* (2019.01); *G06F 16/635* (2019.01); *G06F 16/686* (2019.01); *G06F 16/9535* (2019.01)

(58) Field of Classification Search
None
See application file for complete search history.

(56) References Cited

U.S. PATENT DOCUMENTS

| | | |
|---|---|---|
| 8,200,674 B2 | 6/2012 | Burba et al. |
| 9,218,392 B1 | 12/2015 | Zgraggen et al. |
| 2009/0259606 A1* | 10/2009 | Seah ............... G06F 16/248 706/16 |

(Continued)

OTHER PUBLICATIONS

PCT International Search Report and Written Opinion for International Application No. PCT/US2017/054441 dated Dec. 6, 2017, 15 pages.

(Continued)

*Primary Examiner* — Son T Hoang
(74) *Attorney, Agent, or Firm* — Lowenstein Sandler LLP

(57) ABSTRACT

A plurality of entities relating to popular search queries are identified. A set of entities representing musical artists or events is selected from the plurality of entities. Based on a history of online actions of a user, a subset of the selected set of entities that is relevant to the user is determined, and personalized music recommendations are created for the user, where the personalized music recommendations comprise music content associated with the determined subset of entities that each represent a musical artist or event relating to the popular search queries. The personalized music recommendations are provided for presentation to the user.

14 Claims, 6 Drawing Sheets

(56) References Cited

U.S. PATENT DOCUMENTS

| | | | |
|---|---|---|---|
| 2011/0078020 A1* | 3/2011 | LaJoie | G06Q 30/00 |
| | | | 705/14.53 |
| 2011/0153638 A1* | 6/2011 | McLean | G06F 16/68 |
| | | | 707/769 |
| 2012/0096011 A1 | 4/2012 | Kay et al. | |
| 2014/0074846 A1* | 3/2014 | Moss | G06F 16/24578 |
| | | | 707/740 |
| 2014/0096162 A1* | 4/2014 | Casey | H04N 21/233 |
| | | | 725/61 |
| 2015/0237473 A1* | 8/2015 | Koepke | H04W 4/021 |
| | | | 455/456.3 |
| 2015/0373428 A1* | 12/2015 | Trollope | H04N 21/8133 |
| | | | 704/235 |
| 2016/0335266 A1* | 11/2016 | Ogle | G06F 16/635 |

OTHER PUBLICATIONS

Zhiyong Cheng et al: "Just-for-Me", 1-22 Proceedings of International Conference on Multimedia Retrieval, ICMR '14, Apr. 1, 2814 (2814-84-81), pp. 185-192.

Chun-Che Wu et al: "Learning to personalize trending image search suggestion", Research & Development in Information Retrieval, ACM, 2 Penn Plaza, Suite 781 New York NY 18121-8781 USA, Jul. 3, 2814 (2814-87-83), pp. 727-736.

Ziad Al Bawab et al: "Finding trending local topics in search queries for personalization of a recommendation system", Knowledge Discovery and Data Mining, ACM, 2 Penn Plaza, Suite 781 New York NY 18121-8781 USA, Aug. 12, 2812 (2812-88-12), pp. 397-485.

* cited by examiner

300

```
┌─────────────────────────────────────────────────────────┐
│ IDENTIFY A PLURALITY OF ENTITIES RELATING TO CURRENTLY  │
│              POPULAR SEARCH QUERIES                     │──── 302
└─────────────────────────────────────────────────────────┘
                            │
                            ▼
┌─────────────────────────────────────────────────────────┐
│ SELECT, FROM THE PLURALITY OF ENTITIES, A SET OF ENTITIES│
│           REPRESENTING MUSICAL ARTISTS                  │──── 304
└─────────────────────────────────────────────────────────┘
                            │
                            ▼
┌─────────────────────────────────────────────────────────┐
│ DETERMINE, BASED ON A HISTORY OF ONLINE ACTIONS OF THE  │
│  USER, A SUBSET OF THE SELECTED SET OF ENTITIES THAT IS │
│                  RELEVANT TO THE USER                   │──── 306
└─────────────────────────────────────────────────────────┘
                            │
                            ▼
┌─────────────────────────────────────────────────────────┐
│   CREATE PERSONALIZED MUSIC RECOMMENDATIONS FOR THE     │
│     USER, THE PERSONALIZED MUSIC RECOMMENDATIONS        │
│       COMPRISING MUSIC CONTENT ASSOCIATED WITH THE      │
│   DETERMINED SUBSET OF ENTITIES THAT EACH REPRESENT A   │──── 308
│    MUSICAL ARTIST RELATING TO THE CURRENTLY POPULAR     │
│                    SEARCH QUERIES                       │
└─────────────────────────────────────────────────────────┘
                            │
                            ▼
┌─────────────────────────────────────────────────────────┐
│  PROVIDE THE PERSONALIZED MUSIC RECOMMENDATIONS FOR     │──── 310
│              PRESENTATION TO THE USER                   │
└─────────────────────────────────────────────────────────┘
```

FIG. 3

```
                    ┌──────────────────────────────────────────────┐
                    │ IDENTIFY A PLURALITY OF MUSIC PLAYLISTS      │
                    │ CREATED ON A CONTENT SHARING PLATFORM        │── 402
                    └──────────────────────────────────────────────┘
                                       ↓
                    ┌──────────────────────────────────────────────┐
                    │ IDENTIFY A PLURALITY OF POPULAR EXTERNAL     │
                    │ SEARCH QUERIES SUBMITTED VIA ONE OR MORE     │── 404
                    │ EXTERNAL SEARCH ENGINE PLATFORMS             │
                    └──────────────────────────────────────────────┘
                                       ↓
                    ┌──────────────────────────────────────────────┐
                    │ CORRELATE THE PLURALITY OF MUSIC PLAYLIST TO │
                    │ THE PLURALITY OF POPULAR EXTERNAL SEARCH     │── 406
                    │ QUERIES                                      │
                    └──────────────────────────────────────────────┘
                                       ↓
                    ┌──────────────────────────────────────────────┐
                    │ IMPROVE RANKINGS OF SUBSET OF MUSIC PLAYLISTS│
                    │ THAT MACTH ANY OF THE PLURALITY OF POPULAR   │── 408
                    │ EXTERNAL SEARCH QUERIES                      │
                    └──────────────────────────────────────────────┘
                                       ↓
                    ┌──────────────────────────────────────────────┐
                    │ CREATE THE PERSONALIZED MUSIC RECOMMENDATIONS│
                    │ FOR THE USER BASED ON RANKINGS OF THE        │── 410
                    │ PLURALITY OF MUSIC PLAYLISTS                 │
                    └──────────────────────────────────────────────┘
                                       ↓
                    ┌──────────────────────────────────────────────┐
                    │ PROVIDE THE PERSONALIZED MUSIC RECOMMENDATIONS│── 412
                    │ FOR PRESENTATION TO THE USER                 │
                    └──────────────────────────────────────────────┘
```

FIG. 4

MUSIC RECOMMENDATIONS FROM TRENDING QUERIES

CROSS-REFERENCE TO RELATED APPLICATIONS

This application claims the benefit of U.S. Provisional Application No. 62/440,312, filed Dec. 29, 2016, entitled "Music Recommendations From Trending Queries," which is incorporated by reference herein.

TECHNICAL FIELD

This disclosure relates to the field of music recommendations and, in particular, to personalized music recommendations on a content sharing platform.

BACKGROUND

On the Internet, social media platforms (e.g., social network platforms, content sharing platforms, etc.) allow users to connect to and share information with each other. Many social media platforms include a content sharing aspect that allows users to upload, view, and share content, such as video content, image content, audio content, text content, and so on (which may be collectively referred to as "media items" or "content items"). Such media items may include audio clips, movie clips, TV clips, and music videos, as well as amateur content such as video blogging, short original videos, pictures, photos, other multimedia content, etc. Users may use computing devices (e.g., client devices such as smart phones, cellular phones, laptop computers, desktop computers, netbooks, tablet computers) to play and/or consume media items (e.g., watch digital videos, and/or listen to digital music).

SUMMARY

The following is a simplified summary of the disclosure in order to provide a basic understanding of some aspects of the disclosure. This summary is not an extensive overview of the disclosure. It is intended to neither identify key or critical elements of the disclosure, nor delineate any scope of the particular implementations of the disclosure or any scope of the claims. Its sole purpose is to present some concepts of the disclosure in a simplified form as a prelude to the more detailed description that is presented later.

In an aspect of the disclosure, a method for providing personalized music recommendations to a user includes: identifying, by a processing device of a content sharing platform, a plurality of entities relating to popular search queries (e.g., search queries popular currently, on a given day in the past, over a recent period of time, etc.); selecting, from the plurality of entities, a set of entities representing trending entities such as musical artists or events; determining, based on a history of online actions of the user, a subset of the selected set of entities that is relevant to the user; creating, by the processing device, the personalized music recommendations for the user, the personalized music recommendations comprising music content associated with the determined subset of entities that each represent a musical artist or an event relating to the currently popular search queries; and providing the personalized music recommendations for presentation to the user.

In some implementations, the popular search queries are search queries submitted by at least a threshold number of users via one or more external search engine platforms over a predefined time period.

In some implementations, the musical artists comprise one or more of a singer, a musician, a composer, a music video director, a music video producer, or a band.

In some implementations, the online actions of the user comprise one or more of submitting a search query, accessing a media item, or consuming a media item, wherein consuming the media item comprises watching or listening to the media item.

In some implementations, determining, based on the history of online actions of the user, the subset of the selected set of entities comprises: identifying entities such as musical artists or events associated with the online actions of the user; and determining whether any of the identified entities matches any of the selected set of entities relating to the currently popular search queries.

In some implementations, creating the personalized music recommendations for the user comprises: assigning a score to each of the determined subset of entities based on popularity of respective search queries and relevancy to the user.

In some implementations, creating the personalized music recommendations for the user further comprises: identifying music recommendation candidates that are ranked based on a plurality of factors; and improving a ranking of any of the identified music recommendation candidates that matches one of the determined subset of entities based on a score assigned to a respective entity of the determined subset of entities.

In some implementations, the method further includes: identifying a reference to an artist profile associated with a selected entity (e.g., a selected musical artist or a selected event) in the determined selected subset of entities; and providing the reference for presentation to the user together with the personalized music recommendations.

In some implementations, the method further includes: identifying an online document indicating why a selected entity (e.g., a selected musical artist or a selected event) in the determined selected subset of entities is currently popular; and providing a reference to the online document for presentation to the user together with the personalized music recommendations In some implementations, the music content of the personalized music recommendations is at least one of a playlist or a channel.

In another aspect of the disclosure, a method for providing personalized music recommendations to a user includes: identifying, by a processing device of a content sharing platform, a plurality of music playlists created on the content sharing platform, each of the plurality of music playlists having a ranking; identifying a plurality of popular external search queries submitted via one or more search engine platforms external to the content sharing platform; determining a subset of the plurality of music playlists that matches any of the plurality of currently popular external search queries; improving rankings of the subset of the music playlists based on the plurality of popular external search queries; creating, by the processing device, the personalized music recommendations for the user based on rankings of the plurality of music playlists; and providing the personalized music recommendation for presentation to the user.

In some implementations, the plurality of the popular external search queries are submitted by at least a threshold number of users over a predefined time period.

In some implementations, the method further includes: determining a plurality of musical artists that are each associated with one of the plurality of music playlists;

determining, based on a history of online actions of the user, one or more of the plurality of music playlists that are relevant to the user; and improving rankings of the determined one or more music playlists.

In some implementations, the plurality of musical artists comprises one or more of a singer, a musician, a composer, a music video director, a lyrics creator, a music video producer, or a music band.

In some implementations, the online actions of the user comprise one or more of submitting a search query, accessing a media item, or consuming a media item, wherein consuming the media item comprises watching or listening to the media item.

In some implementations, the method further includes: identifying an online document indicating why a respective external search query is currently popular; and providing a reference to the online document for presentation to the user together with the personalized music recommendations.

Further, computing devices for performing the operations of the above described methods and the various implementations described herein are disclosed. Computer-readable media that store instructions for performing operations associated with the above described methods and the various implementations described herein are also disclosed.

BRIEF DESCRIPTION OF THE DRAWINGS

The present disclosure is illustrated by way of example, and not by way of limitation, in the figures of the accompanying drawings.

FIG. 3 is a flow diagram illustrating a method for providing personalized music recommendations to a user based on trending entities, according to an implementation.

FIG. 4 is a flow diagram illustrating a method for providing music recommendations to a user based on current events, according to an implementation.

DETAILED DESCRIPTION

Figure 1:
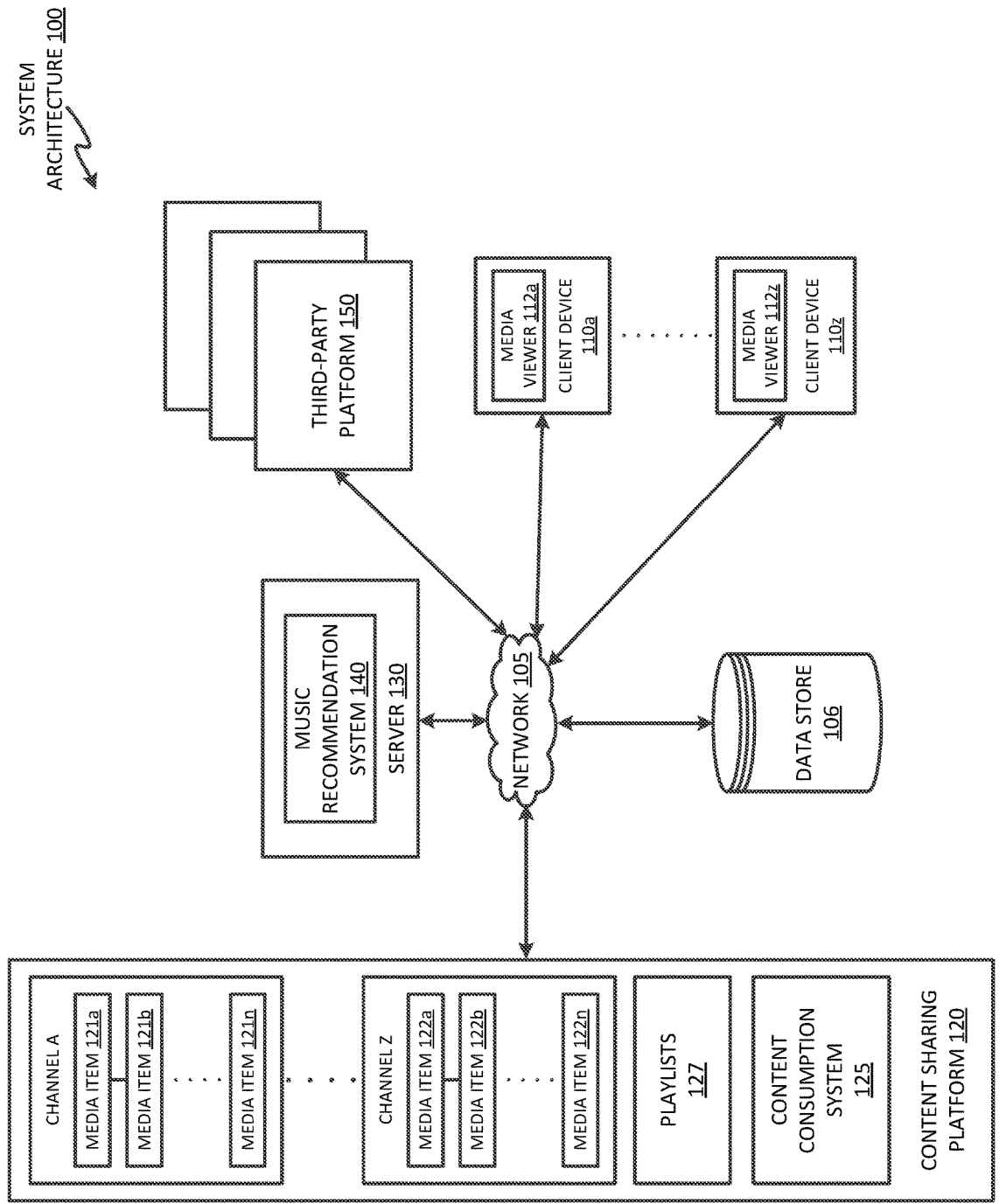
FIG. 1 is a block diagram illustrating an example network architecture in which aspects of the present disclosure may be implemented.

Aspects of the disclosure are directed to providing personalized music recommendations on a content sharing platform. A content sharing platform allows users to find and consume (watch and/or listen to) various media items including, for example, music content items such as music videos and songs.

One of the ways in which content sharing platforms retain users is by providing high quality media item (e.g., music) recommendations. Users tend to listen to artists they like and to music that is relevant to their current contextual surroundings. In conventional systems, music recommendations are usually created based on popular music media items offered on the content sharing platform or based on similarities between a song a user is known to like, and other songs that share similar characteristics. However, a user's music preference may change on a daily basis, based on his or her contextual surroundings (e.g., current events, trending topics, political atmosphere, etc.). Conventional system typically do not consider contextual surroundings of a user when creating recommendations for the user, resulting in recommended content that may not fully reflect the user' needs.

Aspects of the present disclosure address the above and other deficiencies by providing personalized music recommendations that reflect current contextual surroundings of users of a content sharing platform. In some implementations, a music recommendation system of the content sharing platform provides to a user music recommendations that match both the user's known taste in music (e.g., based on a history of music consumption of the user) and currently "trending" entities such as trending musical artists. A trending musical artist is a musical artist relating to (e.g., referenced in or contextually associated with) popular search queries (e.g., search queries popular currently, on a given day in the past, over a recent period of time, etc.). A musical artist can be a singer, a composer, a musician, a band, a music video producer, a music video director, a lyrics creator, etc. In one example, death of famous singer X may result in a large number of search queries pertaining to singer X. The music recommendation system may determine, based on the currently popular search queries, that singer X is a trending musical artist, and that singer X is also one of musical artists included in the viewing/listening history of user A. Based on this determination, the music recommendation system may recommend one or more music playlists (also referred to as steaming radio stations or radios) focused on different songs of singer X to user A.

In other implementations, the music recommendation system may recommend music playlists created on the content sharing platform if such music playlists have a correlation with current events as reflected in popular ("trending") external search queries submitted by various users via external search engine platforms. For example, the content sharing platform may create music playlists for various users and store them for future use. When selecting recommendations, the music recommendation system may identify popular (trending) external search queries, and may determine which of the created music playlists match any of the trending external search queries to find music playlists that are relevant to current events (as reflected by the trending external search queries). The music recommendation system may further recommend at least some of the found music playlists to a user.

According to some aspects of the disclosure, the music recommendation system may also provide an explanation of why the music playlists are being recommended to the user. For example, the music recommendation system may specify that a music playlist is recommended because it is associated with a trending musical artist or a trending search query, and may indicate why such a musical artist or search query is trending (e.g., due to release of the musical artist's album, due death of the musical artists, due to an upcoming holiday such as Valentine's Day, etc.). As such, the user is provided some context as to why the recommendation is being made.

By selecting music content based on trending musical artists and current events, the technology disclosed herein advantageously provides recommendations that reflect current contextual surroundings of a user. This results in recommendations that are more relevant and more interesting to the user, thereby improving an overall user experience with the content sharing platform, and increasing the number of music videos and songs consumed by the user. In addition, the use of search queries to identify trending musical artists and current events allows for more accurate and more efficient identification of trends than the conventional approach that uses popularity of music videos and songs on the content sharing platform because the volume of search queries is higher (and as such provides for more accurate identification of trends) and the use of search queries involves fewer operations (and as such requires less computing resources) than the use of popular musical videos and songs. In particular, the operations pertaining to the use of search queries can involve, for example, (i) identifying entities mentioned in search queries, and (ii) aggregating search queries based on the identified entities. In contrast, the operations pertaining to the use of popular music videos and songs typically involve (i) collecting statistics on consumption history (viewing, listening or approving) of music videos and songs, (ii) identifying popular music videos and songs based on the collected statistics, (iii) examining metadata and/or descriptions of the popular music videos and songs to extract associated entities, and (iv) aggregating the popular musical videos and songs based on the extracted associated entities. Furthermore, by providing recommendations that users are more likely to follow, the technology disclosed herein results in more effective use of processing and storage resources.

The present disclosure often references music media items for simplicity and brevity. However, the teaching of the present disclosure can be applied to various other types of content or media items, including, for example, movies, audio books and images among others.

FIG. 1 illustrates an example system architecture 100 that includes client devices 110a through 110z, a network 105, a data store 106, a content sharing platform 120, a server 130, and third-party platform(s) 150. In one implementation, network 105 may include a public network (e.g., the Internet), a private network (e.g., a local area network (LAN) or wide area network (WAN)), a wired network (e.g., Ethernet network), a wireless network (e.g., an 802.11 network or a Wi-Fi network), a cellular network (e.g., a Long Term Evolution (LTE) network), routers, hubs, switches, server computers, and/or a combination thereof. In one implementation, the data store 106 may be a memory (e.g., random access memory), a cache, a drive (e.g., a hard drive), a flash drive, a database system, or another type of component or device capable of storing data. The data store 106 may also include multiple storage components (e.g., multiple drives or multiple databases) that may also span multiple computing devices (e.g., multiple server computers).

The client devices 110a through 110z may each include computing devices such as personal computers (PCs), laptops, mobile phones, smart phones, tablet computers, network connected televisions, netbook computers etc. In some implementations, client devices 110a through 110z may also be referred to as "user devices." Each client device includes a respective media viewer 112a-z. In one implementation, the media viewers 112a-z may be applications that allow users to view and/or listen to media content, such as images, videos, songs (e.g., music content items), web pages, documents, etc. For example, the media viewers 112a-z may be a web browser that can access, retrieve, present, and/or navigate content (e.g., web pages such as Hyper Text Markup Language (HTML) pages, digital media items or content items, etc.) served by a web server. The media viewers 112a-z may render, display, and/or present the content (e.g., web pages) to a user. The media viewers 112a-z may also display an embedded media player (e.g., a Flash® player or an HTML5 player) that is embedded in a web page (e.g., a web page that may provide information about a product sold by an online merchant). In another example, the media viewers 112a-z may be standalone applications (e.g., mobile applications) that allow users to view and/or listen to digital media content items (e.g., digital videos, songs, digital images, electronic books, etc.).

The media viewers 112a-z may be provided to the client devices 110a through 110z by the server 130 and/or content sharing platform 120. For example, the media viewers 112a-z may be embedded media players that are embedded in web pages provided by the content sharing platform 120. In another example, the media viewers 112a-z may be applications that communicate with the server 130 and/or content service provider 120.

It should be noted that functions described in one implementation as being performed by the content sharing platform 120 can also be performed on the client devices 110a through 110z, and/or server 130 in other implementations, if appropriate. In addition, the functionality attributed to a particular component can be performed by different or multiple components operating together. The content sharing platform 120 can also be accessed as a service provided to other systems or devices through appropriate application programming interfaces, and thus is not limited to use in websites.

In one implementation, the content sharing platform 120 may be one or more computing devices (such as a rackmount server, a router computer, a server computer, a personal computer, a mainframe computer, a laptop computer, a tablet computer, a network connected television, a desktop computer, etc.), data stores (e.g., hard disks, memories, databases), networks, software components, and/or hardware components that may be used to provide a user with access to media items (also referred to as content items) and/or provide the media items to the user. For example, the content sharing platform 120 may allow a user to consume, upload, search for, approve of ("like"), dislike, and/or comment on media items. The content sharing platform 120 may also include a website (e.g., a webpage) that may be used to provide a user with access to the media items.

In implementations of the disclosure, a "user," a "content creator," or a "channel owner" may be represented as a single individual. However, other implementations of the disclosure encompass a "user," a "content creator," or a "channel owner" being an entity controlled by a set of users and/or an automated source. For example, a set of individual users federated as a community in a social network may be considered a "user," a "content creator," or a "channel owner." In another example, an automated consumer may be an automated ingestion pipeline, such as a topic channel, of the content sharing platform 120.

The content sharing platform 120 may include multiple channels (e.g., channels A through Z). A channel can be data content available from a common source or data content having a common topic, theme, or substance. The data content can be digital content chosen by a user, digital content made available by a user, digital content uploaded by a user, digital content chosen by a content provider, digital content chosen by a broadcaster, etc. A channel may include one or more media items 121a-n or 122a-n (e.g., music content items). A channel can be associated with an owner, who is a user that can perform actions on the channel. Different activities can be associated with the channel based on the owner's actions, such as the owner making digital content available on the channel, the owner selecting (e.g., liking) digital content associated with another channel, the owner commenting on digital content associated with another channel, etc. The activities associated with the channel can be collected into an activity feed for the channel. Users, other than the owner of the channel, can subscribe to one or more channels in which they are interested. The concept of "subscribing" may also be referred to as "liking," "following," "friending," and so on.

Once a user subscribes to a channel, the user can be presented with information from the channel's activity feed. If a user subscribes to multiple channels, the activity feed for each channel to which the user is subscribed can be combined into a syndicated activity feed. Information from the syndicated activity feed can be presented to the user. Channels may have their own feeds. For example, when navigating to a home page of a channel on the content sharing platform, feed items produced by that channel may be shown on the channel home page. Users may have a syndicated feed, which is a feed comprised of at least a subset of the content items from all of the channels to which the user is subscribed. Syndicated feeds may also include content items from channels to which the user is not subscribed. For example, the content sharing platform 120 or other social networks may insert recommended content items into the user's syndicated feed, or may insert content items associated with a related connection of the user in the syndicated feed.

The content sharing platform 120 may also include multiple playlists 127. A playlist represents a collection of media items that are configured to play one after another in a particular order without any user interaction. When the last media item stops playing, the first media item may start playing again, providing a continuous viewing or listening experience for the user. A streaming radio station also referred to as a radio may correspond to a playlist that provides a dynamic, continuous stream of audio that may or may not be paused or replayed (similarly to a traditional broadcast media radio station). In some implementations, streaming radio stations may be buffered for offline access. As used herein, the term "music playlist" covers a streaming radio station providing audio music content, as well as a playlist providing music videos and/or other type of content.

Playlists may be curated manually or automatically (e.g., according to genre, artist, band, tempo, dates, etc.). Media items included in playlist 127 may be from the same channel, different channels or independent media items that are not part of any channels. Examples of media items 121a-n and 122a-n can include, and are not limited to, digital videos, digital movies, digital photos, digital music, website content, social media updates, electronic books (ebooks), electronic magazines, digital newspapers, digital audio books, electronic journals, web blogs, real simple syndication (RSS) feeds, electronic comic books, software applications, etc. Media items 121a-n and 122a-n, also referred to herein as music content items, music videos and songs, can include an electronic file that can be executed or loaded using software, firmware or hardware configured to present the digital media item to an entity. In one implementation, the content sharing platform 120 may store the media items 121a-n and 122a-n using the data store 106.

The content sharing platform 120 may include content consumption system 125 that determines a history of user actions associated with media items content 121a-n, 122a-n. In one example, the content consumption system 125 may store a list of music content items accessed, watched or listened to by a user. In another example, the content consumption system 125 may also store search queries submitted by a user on the content sharing platform 120.

The content sharing platform 120 may be associated with or include a music recommendation system 140 hosted by the server 130. The server 130 may be one or more computing devices (e.g., a rackmount server, a server computer, etc.). The music recommendation system 140 may provide personalized music recommendations to users of the content sharing platform 120. As discussed in more detail herein, these music recommendations may reflect contextual surroundings of the user such as current events and trending musical artists and may be provided via user interfaces (UIs) of the content sharing platform 120, including a home channel page UI, a search UI, a playlist UI, etc., and may be presented as feed items or in any other form.

Users of the content sharing platform 120 may also interact with third-party platform(s) 150. A third-party platform 150 may be a social network platform (e.g., social media platform), a search engine platform, another content sharing platform, etc. Another type of third-party platform may be a query statistics service that determines how often a particular search-term is entered via one or more search engine platforms relative to the total search-volume on the one or more search engine platforms across various regions of the world, and in various languages. Based on these determinations, the query statistics service may identify trending search queries and may provide these trending search queries to the music recommendation system 140.

Although implementations of the disclosure are discussed in terms of content sharing platforms and providing personalized music recommendations on the content sharing platform, implementations may also be generally applied to any type of social media platform providing media item recommendations. Such social media platforms are not limited to content sharing platforms that provide channel subscriptions, playlists, and/or internet radio stations to users.

In situations in which the systems discussed herein collect personal information about users, or may make use of personal information, the users may be provided with an opportunity to control whether the content sharing platform 120 collects user information (e.g., information about a user's social network, social actions or activities, profession, a user's preferences, a user's purchase transaction history, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by the content sharing platform 120.

Figure 2:
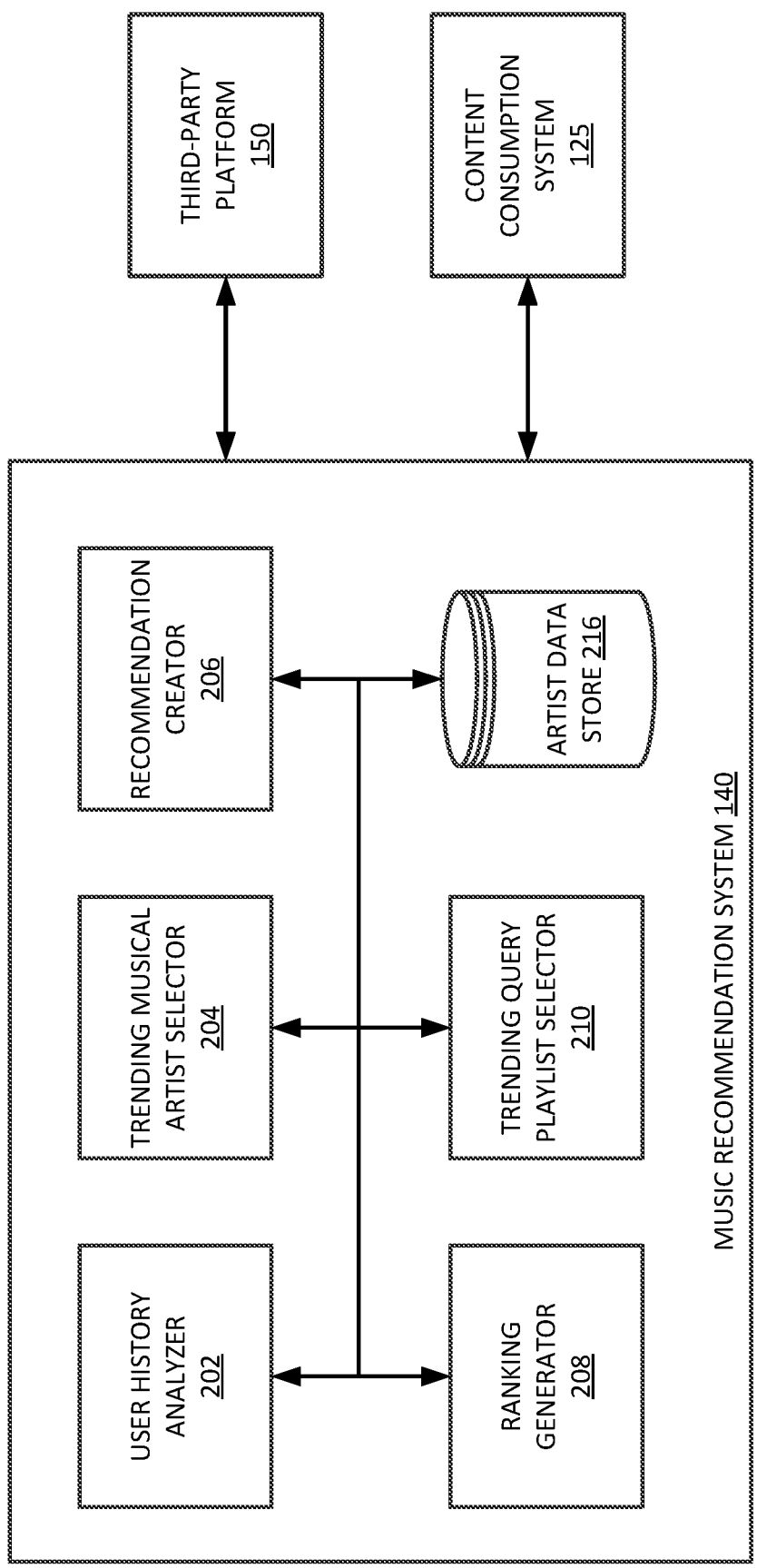
FIG. 2 is a block diagram illustrating an example music recommendation system in accordance with some aspects of the present disclosure.

FIG. 2 is a block diagram illustrating an example music recommendation system 140 in accordance with some aspects of the present disclosure. In one implementation, music recommendation system 140 includes user history analyzer 202, trending musical artist selector 204, recommendation creator 206, ranking generator 208, trending query playlist selector 210, and artist data store 216. Music recommendation system 140 may communicate with third-party platform (e.g., query statistics service) 150 and/or content consumption system 125.

The artist data store 216 may be part of or external to music recommendation system 140 and may reside in a memory (e.g., random access memory), a cache, a drive (e.g., a hard drive), a flash drive, a database system, or another type of component or device capable of storing data.

The artist data store 216 may also include multiple storage components (e.g., multiple drives or multiple databases) that may also span multiple computing devices (e.g., multiple server computers). Artist data store 216 may store information about musical artists associated with media items 121a-n and 122a-n of content sharing platform 120. The information about musical artists may be compiled as music media items are uploaded to the content sharing platform 120 (e.g., based on metadata provided as part of or in addition to the music media items).

The trending musical artist selector 204 may identify entities relating to popular (trending) search queries. The trending search queries may be search queries submitted by at least a threshold number of users via one or more external search engine platforms over a predefined time period from the present time or on a given day or time period in the past (e.g., a specific day of a previous week or the entire previous week). The trending search queries may be identified by the query statistics service that groups various queries directed to similar topics, subjects, etc. and provides clusters of trending (frequently used) query terms. The trending musical artist selector 204 may determine (e.g., using a knowledge base tool analyzing semantic search information) an entity relating to a cluster of trending queries (or query terms). This entity may be a person or an organization. The trending musical artist selector 204 may select, from the trending entities, those entities that represent musical artists (e.g., singers, musicians, composers, music video directors, music video producers, music bands, etc.) based on information about musical artists in the artist data store 216.

The user history analyzer 202 may review a history of online actions of a user and determine, based on this history, which of the selected entities are relevant to a specific user. For example, the user's online actions may include search queries submitted by the user on the content sharing platform 120 and/or via one or more external search engine platforms 150, the user's accesses of media items, the user's consumption (watching or listening) of media items, the user's approval or disapproval of media items, the user's behavior while consuming media items (e.g., pausing, skipping, fast-forwarding, rewinding, etc.), etc. The user history may be created using the content consumption system 125 and/or a search engine system of the content sharing platform 120 and may include musical artists relating to the above user actions. The user history may be in the form of the user's music profile (that specifies the user's favorite musical artists ranked based on the user's implied or expressed interest in these musical artists) or any other form or structure. The user history analyzer 202 may select musical artists from the user history that match any of the musical artists relating to the trending search queries. A musical artist relating to a trending search query is referred to herein as a trending musical artist.

The recommendation creator 206 may find music content (e.g., music playlists, music channels, etc.) associated with the selected music artists, create personalized music recommendations including the music content, and provide the personalized music recommendations for presentation to the user. The music content may refer to music playlists (including streaming radio stations), music channels, and/or individual music media items. Music playlists may be playlists previously created automatically or by other users or playlists that are being created automatically for selected trending musical artists that are also reflected in the user history.

In some implementations, the recommendation creator 206 may provide recommendations based on rankings provided by the ranking generator 208. For example, the ranking generator 208 may assign a score to each selected musical artist that is both trending and indicated in the user history based on popularity ("trendiness") of the selected musical artist (e.g., a frequency of search queries related to the selected musical artist) and relevancy of the selected musical artist to the user (e.g., how frequently the user performs an online action with respect to musical content related to the selected musical artist). The ranking generator 208 may then improve (e.g., boost) rankings of music recommendation candidates that match the selected musical artists based on respective assigned scores. When creating recommendations, the recommendation creator 206 may choose music recommendation candidates with the highest rankings (e.g., 20 playlists and/or channels with highest rankings) and present them to the user in the order defined by the rankings.

In some implementations, the music recommendation candidates may only include music content associated with the musical artists that are both trending and indicated in the user history. Alternatively, the music recommendation candidates may also include music media items that are popular (frequently requested and/or consumed) on the content sharing platform, music media items consumed by the user's contacts, music media items that are similar to those consumed by the user, etc. All of these music items may be ranked based on popularity and relevancy to the user, where relevancy to the user may be defined by the user history of online actions, and/or user demographics (e.g., geographic location, language, etc.). As discussed above, the ranking generator 208 may improve (e.g., boost) rankings of music recommendation candidates related to musical artists that are both trending and from the user's history. The recommendation creator 206 may then use the resulting rankings of the music recommendation candidates to select music media items with highest rankings for recommendation to the user. The music recommendations may be provided via UIs of the content sharing platform 120, including a home channel page UI, a search UI, a playlist UI, etc., and may be presented as feed items or in any other form.

In one implementation, for recommended music content related to a trending musical artist, the recommendation creator 206 may include a reference to an artist profile of the trending musical artist and provide this reference for presentation to the user together with the respective music recommendation. The reference to the artist profile may direct a user to a webpage on the content sharing platform or to a webpage located elsewhere on the Internet. The reference may be a link (e.g., HyperText Transport Protocol (HTTP) link, hyperlink, etc.)

Alternatively or in addition, recommendation creator 206 may identify an online article or a similar online document indicating why the musical artist is trending (e.g., due to release of the musical artist's album, death of the musical artists, etc.), and provide a reference (e.g., link) to this online document for presentation to the user together with the respective music recommendation. According to some implementations, recommendation creator 206 may also or alternatively provide a summary (e.g., 1-2 sentences) specifying why the recommendation is provided and/or an entity is trending (e.g., due to release of a musical artist's album, death of a musical artists, etc.). The summary may be created based on user input or generated automatically by searching online sources (e.g., predefined online news services) using the name of a trending musical artist and extracting information about an event associated with the trending musical artist. As such, the user is provided some context as to why the recommendation was made.

In yet another implementation, the reference to the online document or the summary may be saved in association with the respective music playlist, as well as the period of time during which the musical artist relating to the music playlist has been trending, and this information (the period of time and/or the reference to the online document) may be subsequently presented on a playlist UI of the music playlist.

According to other aspects of the present implementations, the music recommendation system 140 may recommend music playlists created on the content sharing platform 120 if such music playlists have a correlation with current events as reflected in currently trending external search queries submitted by various users via external search engine platforms. Current events may refer to holidays, new music and/or video release events, political events, popular cultural events, trending social media events, or any other single-day or multi-day events.

In some implementations, the trending query playlist selector 210 may receive currently trending external search queries (e.g., from the query statistics service that groups various queries directed to similar topics, subjects, etc. and provides clusters of trending query terms) and may correlate these trending external search queries with music playlists created on and/or hosted by the content sharing platform. The correlation may be done by comparing entities mentioned in the trending external search queries (e.g., using clusters of trending query terms) with information pertaining to the created music playlists. Information pertaining to a created music playlist may include, for example, the title and/or the description of the music playlist, titles and/or descriptions of music videos or songs from the music playlist, or any combination of the above. Upon finding a matching music playlist, the trending query playlist selector 210 may add the matching music playlist to music recommendation candidates that are being created for the user. The ranking generator 208 may improve (e.g., boost) rankings of the music playlists that match trending external search queries. In some implementations, the user history analyzer 202 may use the user history to further filter out the selected music playlists. In particular, the user history analyzer 202 may determine musical artists relating to the selected music playlists, match the determined artists with musical artists referenced in the user history, and further improve (e.g., boost) rankings of music playlists related to the musical artists that are also referenced in the user history.

When creating recommendations, the recommendation creator 206 may choose music recommendation candidates with the highest rankings (e.g., 20 playlists and/or channels with highest rankings) and present them to the user in the order defined by the rankings.

In some implementations, the music recommendation candidates may include music media items that are popular (frequently requested and/or consumed) on the content sharing platform, music media items consumed by the user's contacts, music media items that are similar to those consumed by the user, etc. All of these music items may be ranked based on popularity and relevancy to the user, where relevancy to the user may be defined by the user history of online actions, and/or user demographics (e.g., geographic location, language, etc.). The recommendation creator 206 may use the resulting rankings of the music recommendation candidates to select music media items with highest rankings for recommendation to the user. The music recommendations may be provided via UIs of the content sharing platform 120, including a home channel page UI, a search UI, a playlist UI, etc., and may be presented as feed items or in any other form.

In one implementation, recommendation creator 206 may identify an online article or a similar online document about a current event causing the search query that was used to create a respective music playlist to be trending (e.g., Valentine's Day, Museum Mile Festival in New York City, etc.), and provide a reference (e.g., link) to this online document for presentation to the user together with the respective music recommendation. Alternatively or in addition, recommendation creator 206 may create a summary (e.g., 1-2 sentences) specifying why the recommendation is being provided or an entity is trending (e.g., due to release of a musical artist's album, death of a musical artists, an upcoming holiday, a political event, etc.). The summary may be created based on user input or generated automatically by searching online sources (e.g., predefined online news services) using the name of a trending musical artist and extracting information about an event associated with the trending musical artist. As such, the user is provided some context as to why the recommendation was made. In yet another implementation, the reference to the online document and/or the summaries may be saved in association with the respective music playlist, as well as the period of time during which the search query used to create the music playlist has been trending, and this information (the period of time and/or the reference to the online document) may be subsequently presented on a playlist UI of the music playlist.

FIGS. 3-4 depict flow diagrams for illustrative examples of methods 300 and 400 for providing personalized music recommendations to a user. Methods 300 and 400 may be performed by processing devices that may include hardware (e.g., circuitry, dedicated logic), software (such as is run on a general purpose computer system or a dedicated machine), or a combination of both. Methods 300 and 400 and each of their individual functions, routines, subroutines, or operations may be performed by one or more processors of the computer device executing the method. In certain implementations, methods 300 and 400 may each be performed by a single processing thread. Alternatively, methods 300 and 400 may be performed by two or more processing threads, each thread executing one or more individual functions, routines, subroutines, or operations of the method.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media.

FIG. 3 is a flow diagram illustrating a method 300 for providing personalized music recommendations to a user based on trending entities, according to an implementation. Method 300 may be performed by content sharing platform 120 and/or music recommendation system 140 of FIG. 1.

Referring to FIG. 3, at block 302, processing logic identifies trending entities (e.g., entities relating to currently popular search queries). At block 304, processing logic selects, from the trending entities, a set of entities representing musical artists.

At block 306, processing logic determines, based on a history of online actions of the user, a subset of the selected set of entities that is relevant to the user. As discussed above, this determination can be made by correlating trending musical artists with musical artists referenced in the user history (e.g., user profile). In addition, the determination may be also based on characteristics of the user (e.g., user country of residence, user language, user cultural background, etc.). Advantageously, the determination performed at block 306 allows for the selection of currently trending musical artists who are likely to be of interest to the user. At block 308, processing logic creates the personalized music recommendations for the user. In one implementation, the personalized music recommendations include music content associated with the determined subset of entities that each represents a trending musical artist. At block 310, processing logic provides the personalized music recommendations for presentation to the user.

FIG. 4 is a flow diagram illustrating a method 400 for providing personalized music recommendations to a user based on current events, according to an implementation. Method 400 may be performed by content sharing platform 120 and/or music recommendation system 140 of FIG. 1.

Referring to FIG. 4, at block 402, processing logic identifies music playlists created on the content sharing platform. Each of the music playlist may have a ranking based on its popularity on the content sharing platform, relevancy to the user (e.g., higher ranking if the playlist was created for the user (e.g., based on consumption history or preferences of the user) and lower ranking if the playlist was created for another user (e.g., based on consumption history or preferences of another user)).

At block 404, processing logic identifies trending external search queries submitted via one or more search engine platforms external to the content sharing platform. At block 406, processing logic correlates the music playlists to the trending external search queries. At block 408, processing logic identifies a subset of the music playlists that match any of the trending external search queries, and improves rankings of the identified music playlists.

In some implementations, processing logic may also use the user history to further match musical artists relating to the music playlists identified at block 408 with musical artists referenced in the user history. When such a match is found, processing logic may further improve the ranking of a respective music playlist.

At block 410, processing logic creates personalized music recommendations for the user based on resulting rankings of music playlists. At block 412, processing logic provides the personalized music recommendations for presentation to the user.

Figure 5:
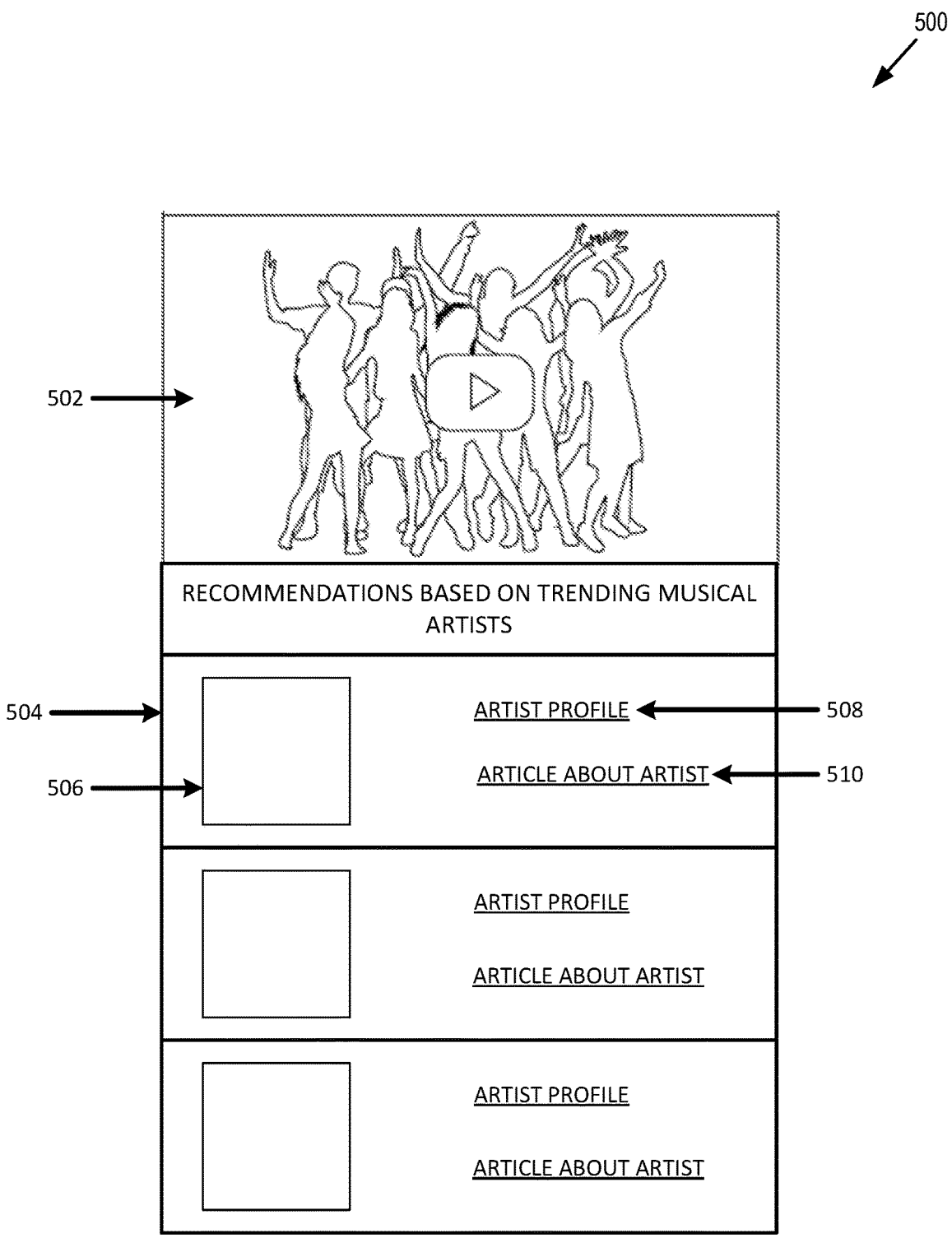
FIG. 5 illustrates an example personalized music recommendation graphical user interface in accordance with some aspects of the disclosure.

FIG. 5 illustrates an example personalized music recommendation graphical user interface (GUI) 500 in accordance with some aspects of the disclosure. GUI 500 may be provided by content sharing platform 120 of FIG. 1.

GUI 500 may be displayed on a client device (e.g., client device 110) of a user, and may include a media player portion 502 in which a media player presents and plays a music media item (e.g., obtained from content sharing platform 120 of FIG. 1). GUI 500 may also include a recommendation portion 504 presenting (e.g., in a feed) personalized recommendations 504 based on trending musical artists.

Each personalized recommendation may be a music playlist (including a streaming radio station), a music channel or an individual music media item. For example, a personalized recommendation may be a music playlist that can be represented by a visual indicator (e.g., an image, name, etc.) 506 that may be selected by the user to start playing the music playlist and/or navigate to a separate GUI to view more information about the playlist. In one implementation, GUI 500 includes a link 508 to an artist profile of the related musical artist, and/or a link 510 to an online document (e.g., news article) that provides an explanation of why the related musical artist is trending, as described in more detail herein. Alternatively or in addition, a summary (e.g., 1-2 sentences) specifying why the recommendation is being provided (e.g., due to release of a musical artist's album, death of a musical artists, etc.) may be provided, as described in more detail herein.

Figure 6:
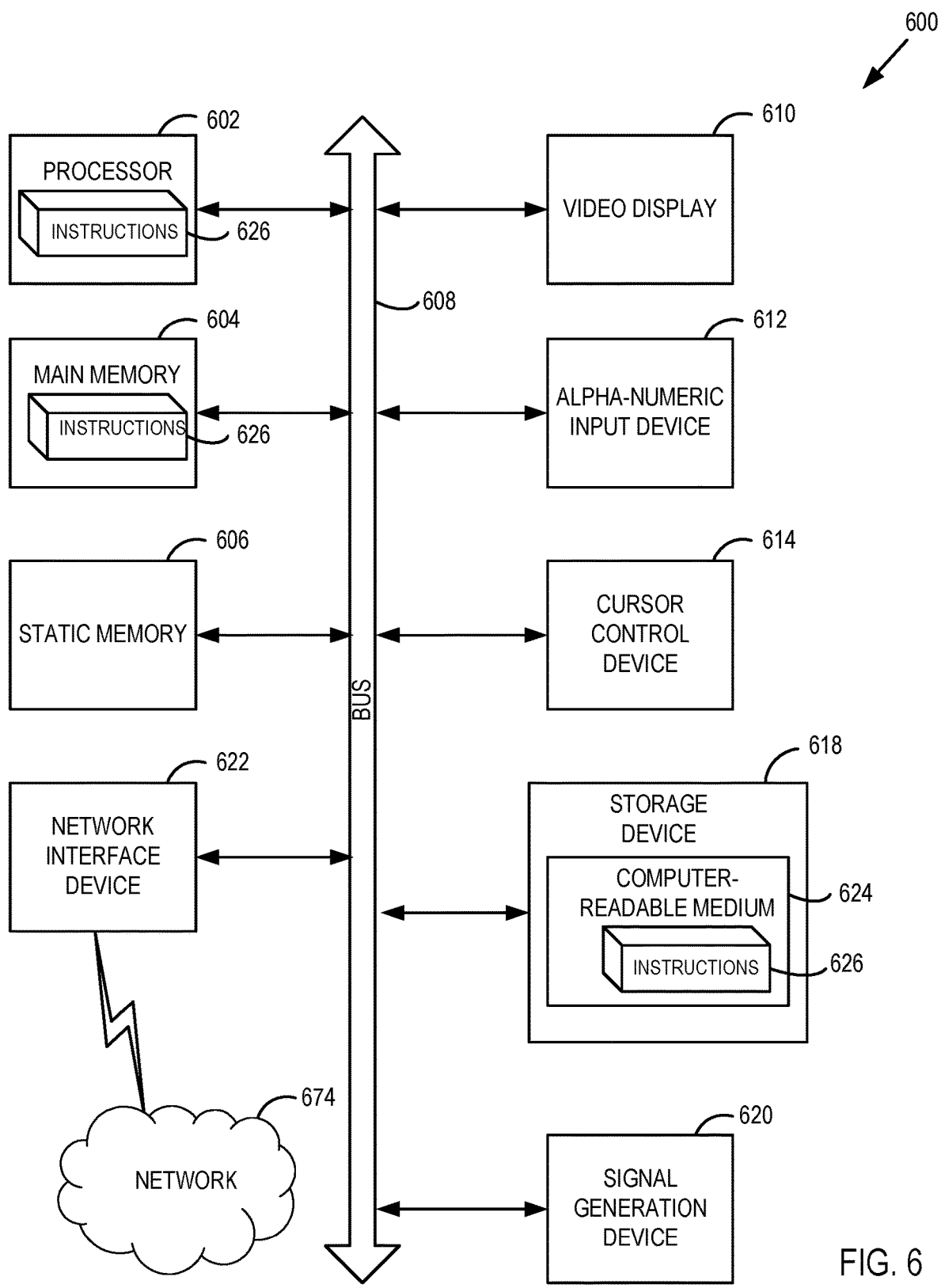
FIG. 6 is a block diagram illustrating an example computer system in which aspects of the disclosure can be implemented.

FIG. 6 illustrates a diagrammatic representation of a machine in the exemplary form of a computer system 600 within which a set of instructions, for causing the machine to perform any one or more of the methodologies discussed herein, may be executed. In alternative implementations, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a network connected television, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one implementation, computer system 600 may be representative of a server, such as server 130, executing music recommendation system 140, as described with respect to FIGS. 1-5. In another implementation, computer system 600 may be representative of a client device, such as client device 110, or a content sharing platform, such as content sharing platform 120, as described with respect to FIGS. 1-5.

The exemplary computer system 600 includes a processing device 602, a main memory 604 (e.g., read-only memory (ROM), flash memory, dynamic random access memory (DRAM) (such as synchronous DRAM (SDRAM) or Rambus DRAM (RDRAM), etc.), a static memory 606 (e.g., flash memory, static random access memory (SRAM), etc.), and a data storage device 618, which communicate with each other via a bus 608. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Processing device 602 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 602 may also be one or more special-purpose processing devices such as an application specific integrated circuit (ASIC), a field programmable gate array (FPGA), a digital signal processor (DSP), network processor, or the like. The processing device 602 is configured to execute instructions (e.g., processing logic) 626 for performing the operations and steps discussed herein.

The computer system 600 may further include a network interface device 622. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 620 (e.g., a speaker).

The data storage device 618 may include a computer-readable storage medium 624 (also referred to as a machine-readable storage medium), on which is stored one or more set of instructions 626 (e.g., software) embodying any one or more of the methodologies of functions described herein. The instructions 626 may also reside, completely or at least partially, within the main memory 604 and/or within the processing device 602 during execution thereof by the computer system 600; the main memory 604 and the processing device 602 also constituting machine-readable storage media. The instructions 626 may further be transmitted or received over a network 674 via the network interface device 622.

The computer-readable storage medium 624 may also be used to store instructions to perform a method for providing personalized music recommendations, as described herein. While the computer-readable storage medium 624 is shown in an exemplary implementation to be a single medium, the term "machine-readable storage medium" should be taken to include a single medium or multiple media (e.g., a centralized or distributed database, and/or associated caches and servers) that store the one or more sets of instructions. A machine-readable medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

The preceding description sets forth numerous specific details such as examples of specific systems, components, methods, and so forth, in order to provide a good understanding of several implementations of the present disclosure. It will be apparent to one skilled in the art, however, that at least some implementations of the present disclosure may be practiced without these specific details. In other instances, well-known components or methods are not described in detail or are presented in simple block diagram format in order to avoid unnecessarily obscuring the present disclosure. Thus, the specific details set forth are merely exemplary. Particular implementations may vary from these exemplary details and still be contemplated to be within the scope of the present disclosure.

Reference throughout this specification to "one implementation" or "an implementation" means that a particular feature, structure, or characteristic described in connection with the implementation is included in at least one implementation. Thus, the appearances of the phrase "in one implementation" or "in an implementation" in various places throughout this specification are not necessarily all referring to the same implementation. In addition, the term "or" is intended to mean an inclusive "or" rather than an exclusive "or."

Although the operations of the methods herein are shown and described in a particular order, the order of the operations of each method may be altered so that certain operations may be performed in an inverse order or so that certain operation may be performed, at least in part, concurrently with other operations. In another implementation, instructions or sub-operations of distinct operations may be in an intermittent and/or alternating manner.

What is claimed is:

1. A method for providing personalized music recommendations to a user, the method comprising:
   identifying, by a processing device of a content sharing platform, a plurality of entities relating to popular search queries submitted via one or more search engine platforms, wherein
      the content sharing platform enables sharing of music content between users, and
      the plurality of entities include musical artists and other entities distinct from the musical artists;
   selecting, by the processing device and from the identified plurality of entities, a set of entities that each represents a distinct musical artist relating the popular search queries;
   obtaining, by the processing device, a history of online actions of the user on the content sharing platform;
   determining, by the processing device, a subset of the selected set of entities based on the obtained history of online actions of the user, wherein each entity in the determined subset of entities is a distinct musical artist that is relevant to the user;
   creating and storing on the content sharing platform, by the processing device, the personalized music recommendations for the user, the personalized music recommendations comprising music content associated with each of the determined subset of entities; and
   providing, by the processing device, the personalized music recommendations over a network for presentation to the user, wherein at least one of the presented personalized music recommendations is to be selected by the user for consumption.

2. The method of claim 1, wherein the popular search queries are search queries submitted by at least a threshold number of users via the one or more search engine platforms over a predefined time period, the one or more search engine platforms comprising at least one search engine platform that is external to the content sharing platform.

3. The method of claim 1, wherein the distinct musical artist comprises one of a singer, a musician, a composer, a music video director, a music video producer, or a band.

4. The method of claim 1, wherein the online actions of the user comprise one or more of submitting a search query, accessing a media item, or consuming a media item, wherein the consuming the media item comprises watching or listening to the media item.

5. The method of claim 1, wherein the determining, based on the history of online actions of the user, the subset of the selected set of entities comprises;
   identifying musical artists associated with the online actions of the user; and determining whether any of the identified musical artists matches any of the selected set of entities relating to the popular search queries.

6. The method of claim 1, wherein the creating the personalized music recommendations for the user comprises:
assigning a score to each of the determined subset of entities based on popularity of respective search queries and relevancy to the user.

7. The method of claim 6, wherein the creating the personalized music recommendations for the user further comprises:
identifying music recommendation candidates that are ranked based on a plurality of factors; and
improving a rank of any of the identified music recommendation candidates that matches one of the determined subset of entities based on a score assigned to a respective entity of the determined subset of entities.

8. The method of claim 1, further comprising:
identifying a reference to an artist profile associated with a respective entity in the determined subset of entities; and
providing the reference for presentation to the user together with the personalized music recommendations.

9. The method of claim 1, further comprising:
identifying an online document indicating why a respective entity in the determined subset of entities is popular; and
providing a reference to the online document for presentation to the user together with the personalized music recommendations.

10. The method of claim 1, further comprising:
creating a summary indicating why a respective entity in the determined subset of entities is popular; and
providing the summary for presentation to the user together with the personalized music recommendations.

11. The method of claim 1, wherein the music content of the personalized music recommendations is at least one of a playlist or a channel.

12. A system for providing personalized music recommendations to a user, the system comprising:
a memory; and
a processing device of a content sharing platform, operatively coupled to the memory, the processing device is configured to:
identify a plurality of entities relating to popular search queries submitted via one or more search engine platforms, wherein
the content sharing platform enables sharing of music content between users, and
the plurality of entities include musical artists and other entities distinct from the musical artists;
select, from the identified plurality of entities, a set of entities that each represents a distinct musical artist relating the popular search queries;
obtain a history of online actions of the user on the content sharing platform;
determine a subset of the selected set of entities based on the retrieved history of online actions of the user, wherein each entity in the determined subset of entities is a distinct musical artist that is relevant to the user;
create and store, on the content sharing platform, the personalized music recommendations for the user, the personalized music recommendations comprising music content associated with each of the determined subset of entities;
provide the personalized music recommendations over a network for presentation to the user, wherein at least one of the personalized music recommendations is to be selected by the user for consumption.

13. The system of claim 12, wherein to create the personalized music recommendations for the user, the processing device is configured to:
assign a score to each of the determined subset of entities based on popularity of respective search queries and relevancy to the user.

14. The system of claim 13, wherein to create the personalized music recommendations for the user, the processing device is further configured to:
identify music recommendation candidates that are ranked based on a plurality of factors; and
improve a rank of any of the identified music recommendation candidates that matches one of the determined subset of entities based on the corresponding score assigned to a respective entity of the determined subset of entities.

* * * * *